United States Patent
Willrett et al.

[11] Patent Number: 5,910,329
[45] Date of Patent: Jun. 8, 1999

[54] PROCESS FOR PRODUCING FROZEN YOGURT MIX USING *S. THERMOPHILUS* STARTER CULTURE

[75] Inventors: Douglas Lynn Willrett, Madison, Wis.; William Robert King, Walnut Creek, Calif.

[73] Assignee: Rhodia Inc., Cranbury, N.J.

[21] Appl. No.: 08/612,508

[22] Filed: Mar. 7, 1996

Related U.S. Application Data

[63] Continuation-in-part of application No. 08/407,227, Mar. 21, 1995, abandoned, which is a continuation of application No. 08/182,260, Jan. 14, 1994, abandoned, which is a continuation-in-part of application No. 07/824,608, Jan. 23, 1992, abandoned.

[51] Int. Cl.$^6$ ..................................................... A23C 9/12
[52] U.S. Cl. ............................... 426/42; 426/34; 426/43; 426/580; 426/583
[58] Field of Search .................. 426/34, 42, 43, 426/580, 583, 41, 564, 565

[56] References Cited

U.S. PATENT DOCUMENTS

| | | | |
|---|---|---|---|
| 3,876,808 | 4/1975 | Anderson | 426/61 |
| 4,416,905 | 11/1983 | Lundstedt et al. | 426/34 |
| 4,938,973 | 7/1990 | Klaver et al. | 426/42 |
| 4,971,810 | 11/1990 | Hoyda et al. | 426/43 |
| 5,098,721 | 3/1992 | Kosikowski et al. | 426/61 |
| 5,409,718 | 4/1995 | Klaver et al. | 426/42 |

FOREIGN PATENT DOCUMENTS

| | | |
|---|---|---|
| 0148299 A1 | 10/1984 | European Pat. Off. |
| 60-256341 | 12/1985 | Japan . |
| 62-55039 | 3/1987 | Japan . |
| 2-268644 | 11/1990 | Japan . |

OTHER PUBLICATIONS

Tamime, A.Y., and Robinson R.K., Yoghurt Science and Technology, 1985, pp. 8, 276–281, 328–333, Pergamon Press, Oxford.

Kirk & Othmer, Encyclopedia of Chemical Technology, Third Edition, vol. 15, p. 564, John Wiley & Sons, Inc. (1981).

W. S. Arbuckle, Ice Cream, Fourth Edition, an Avi Book, Van Nostrand Reinhold Company, 1986, pp. 3, 29 and 434.

Marshall, et al., Yoghurt Made From Single Starter Organisms, J. of Dairy Research, vol. 49, pp. 147–152, 1982.

*Primary Examiner*—Leslie Wong
*Attorney, Agent, or Firm*—John A. Shedden; Andrew M. Solomon

[57] ABSTRACT

A process utilizing a yogurt starter culture medium of milk solids, yeast, phosphate and a minor but substantial amount of a flavor neutral, enzymatically treated lactalbumin which improves shelf life and flavor of yogurt product mix by accentuating development of *S. thermophilus* and utilizing same for the fermentation of the yogurt base.

8 Claims, No Drawings

PROCESS FOR PRODUCING FROZEN YOGURT MIX USING *S. THERMOPHILUS* STARTER CULTURE

This application is a Continuation-In-Part of U.S. Ser. No. 08/407,227 filed Mar. 21, 1995, now abandoned, which is a Continuation of U.S. Ser. No. 08/182,260 filed Jan. 14, 1994, now abandoned, which is a Continuation-In-Part of U.S. Ser. No. 07/824,608 filed Jan. 23, 1992, now abandoned.

The present invention relates to starter cultures and methods for preparing same for frozen yogurt products and more particularly a milk based starter composition for frozen yogurt cultures particularly *Streptococcus thermophilus* cultures used to prepare frozen yogurt products.

DESCRIPTION OF THE PRIOR ART

Yogurt is a dairy product whereby milk is fermented with *Lactobacillus bulgaricus* and *Streptococcus thermophilus* organisms which produce lactic acid. It has been found that these two organisms when cultured together, stimulate one another's growth.

The manufacture of yogurt is similar to that used for the production of buttermilk.

Typically, milk with a fat content of 1 to 5 weight percent and a nonfat solids content (SNF) of from about 11 to 16 weight percent, is heated to from about 82°–95° C. for about 10 to 30 minutes. After homogenization, the milk is cooled to from about 43 to about 46° C. and inoculated with about a 2 weight percent *L. bulgaricus* and *S. thermophilus* starter culture. The product is incubated at 43° C. for about three hours in a vat or in the final container. The yogurt is then cooled and held at less than 4.4° C. The cooled product should have a titratable acidity of 1.0 to 1.2% and a pH of 4.2 to 4.5. The titratable acidity is expressed in terms of percentage of lactic acid which is determined by the amount of 0.1N NaOH/100 mL required to neutralize the substance. Thus, 10 mL of 0.1N NaOH/100 mL required to neutralize the substance represents 0.10% acidity.

Frozen yogurt is a dessert-like food product prepared by freezing, while stirring, a dairy mix usually prepared by blending a ripened yogurt base, prepared as described above, with a mixture of stabilizers, milk solids, sugar and water. Consumer tastes dictate that the frozen yogurt have a less acidic taste than that of the standard refrigerated yogurt and, therefore, the pH of the final dairy mix is normally greater than 5; preferably from above 5 to about 6.

It has long been recognized that the use of the symbiotic relationship between the *L. bulgaricus* and the *S. thermophilus* organisms to create the yogurt organoleptic properties creates a problem. The continuing formation of acid and the progressive degradation of protein as a consequence of the presence of the lactobacillus, results in the development of a sour and/or bitter taste in the yogurt or frozen dairy mix upon storage. In many commercial yogurts, up to 7 weight percent sugar is added to offset this resulting bitterness. Many attempts have been made to solve this continuing acidification problem.

In U.S. Pat. No. 5,409,718 (Klaver, et al.) a yogurt product with good acid stability is prepared by i) first inoculating milk with a thermophilic lactobacillus microorganism, ii) incubating the inoculated milk, iii) heating the incubated milk to destroy the lactobacillus, iv) inoculating the incubated milk with a Streptococcus microorganism, and v) incubating the further inoculated milk.

European Patent EP 0,148,299 describes a method in which lactobacilli are added, but only after the acidification by the streptococcus in the presence of stimulants, which are not described in more detail, has gone to completion, thus avoiding the co-culturing continuing acidification.

Yogurts have been prepared without the lactobacillus by Marshall, et al. (J. Dairy Research 49 (1982) 147). When *S. thermophilus* was used alone, the milk was treated with either a casein hydrolysate or a fungal proteinase. The pH values of these single starter yogurts were between 4.26 and 4.5. However, when assessed for acidity and flavor, all of the products produced were judged inferior to the conventional mixed culture yogurts. In fact, the fungal proteinase was said to give an "unclean catty flavor to the yogurt".

Klaver, et al. (U.S. Pat. No. 4,938,973) have developed a process to avoid having in the final product organisms which may affect the quality adversely, such as the lactobacillus microorganism in the yogurt, while substances produced by these organisms are nevertheless able to permeate the culture liquid which is being converted into the final product. This separation is accomplished via use of a membrane fermenter. Essentially, in yogurt production, the thermophilic streptococci are cultured on one side of a semipermeable membrane while the *L. bulgaricus* is cultured on the other side. Apparently, amino acids released by the lactobacillus pass through the membrane to stimulate the *S. thermophilus* growth while the formic acid produced by the streptococcus passes through the membrane to stimulate the growth of the lactobacillus.

Kokai (Japanese Unexamined Patent Publication) No. 62-55039 (Morinaga Milk K. K.) discloses a process to incorporate a live bifidus bacteria in yogurt wherein a milk product is initially treated with an endopeptidase to hydrolyze the protein; inoculated with *L. acidophillus* and *S. thermophilus*; fermented; stabilized; and has the bifidus bacteria added. Example 75 attempted to produce a bifidus yogurt product fermenting with only the *S. thermophilus*; however, the flavor quality was disclosed to be poor.

Kokai No. 60-256341 (Tokumaru) attempts to minimize the continuous production of acid by lactobacillus during the latter period of fermentation and the following processing/storage by increasing the ratio of the *S. thermophilus* to the *Lactobacillus bulgaricus* in the preculture to 100:1; inoculating a dairy mixture; and subsequently culturing same.

Kokai No. 2-268644 (Sankyo Dairy K. K.) discloses various methods that have been tried to reduce the continuous fermentation of the yogurt during the process of distribution which creates too much acidity in the product by the time it reaches the consumer. The methods involve fermenting the milk with i) weakly fermenting strains; ii) cold-sensitive strains; and iii) non-lactose-fermenting mutants, all of which have inherent problems as discussed in the publication. The Sankyo Dairy solution to the continuing fermentation problem is to utilize a co-culture starter of 1) a reversible mutant of *L. helveticus*, which strongly ferments glucose, and 2) a reversible mutant of *S. thermophilus*, which adds flavor and slightly reduces the lactose.

Tamine, et al. (Yogurt Science and Technology) speculate that use of certain milk-based compounds, such as hydrolyzed casein or glucagon "may be an advantage if yogurt can be produced successfully using a single strain starter, i.e., *S. thermophilus*".

Frozen yogurt mixes have a unique problem that is specific to these intermediate products. As a result of the presence of gram negative bacteria, frozen yogurt mixes, which are merely refrigerated and shipped to the producer of the final yogurt products, have severe shelf-life problems.

Regular yogurt has a pH range of from about 3.7 to about 4.5. Gram negative bacteria cannot grow well below a pH of 4.6 and, therefore, do not pose a spoilage problem in regular yogurt. However, the market place for frozen yogurt mixes demands a pH of greater than 5, preferably one in the range of from greater than 5 to about 6. Gram negative bacteria thrive in this more alkaline environment and thus cause shipping and storage shelf-life deterioration of frozen yogurt mixes.

Freezing the "frozen" yogurt mix during shipping and storage would, of course, stabilize the gram negative growth; however, this is economically undesirable for such a process is expensive. Thus, it would be highly desirable to find a process for the production of a frozen yogurt mix that would reduce gram negative growth in the refrigerated mix, thus enabling extended shelf-life while retaining acceptable flavor and organoleptic properties in the final frozen yogurt product. This high pH, gram negative spoilage problem has not been addressed by any of the art discussed above, nor, of course, has any solution been proposed.

SUMMARY OF THE INVENTION

The use of a starter medium containing a major amount of milk product solids and a specific milk protein nutrient having minimal flavor impact on final frozen yogurt flavor has been found to promote the growth of Streptococcus thermophilus bacteria and to produce a frozen yogurt mix which has significantly improved product shelf life due to reduced gram negative spoilage and reduced acidity development during refrigerated storage; minimal milk protein off flavor; a lack of undesirable acid flavor resulting from the usual use of L. bulgaricus; and improved viscosity and water binding properties resulting from the polysaccharides developed by S. thermophilus during culturing.

The culture medium of the invention contains a major amount of whey and nonfat dry milk, minor amounts of yeast extract and phosphate nutrients and a minor but substantial amount of a specific flavor neutral milk nutrient, that is, a nutrient prepared from the enzymatic treatment of lactalbumin.

The culture medium is hydrated in water, pasteurized, cooled and inoculated with S. thermophilus. This composition is typically cultured for up to 8 hours and needs continuous addition of a base, preferably $NH_4OH$ to maintain a pH of about 6.0. The cultured starter medium is next added to pasteurized yogurt base to inoculate the base and the mix cultured for about 6 hours to develop the characteristic yogurt acidity and viscosity or gel in the ripened yogurt base. The final frozen yogurt mix is prepared by blending the ripened yogurt base with a second mixture, usually containing stabilizers, milk solids, sugar and water. The ripened base typically comprises from about 5 to about 40 weight percent of the final frozen yogurt mix, preferably from about 10 to about 35 weight percent based on the total weight of the frozen yogurt mix.

The S. thermophilus growth in a lactobacilli-free environment insures a mild flavored, frozen yogurt mix which is stable at refrigerated storage for a longer period of time than can be obtained from previous frozen yogurt mixes cultured with S. Thermophilus and lactobacilli such as L. bulgaricus.

DETAILED DESCRIPTION OF THE INVENTION

The dry culture medium of this invention comprises a mixture of a major amount of milk proteins, minor amounts of yeast extract and phosphate nutrients and a minor but substantial amount of a bland hydrolyzed milk protein amino acid containing nutrient, specifically an enzymatically treated lactalbumin. An amount of the culture medium is added to water, pasteurized and cooled. S. thermophilus is then added to inoculate the mixture which is cultured to develop the S. thermophilus growth. The starter culture is then used to inoculate a pasteurized yogurt base which is then fermented to produce the ripened yogurt base and ultimately the final frozen yogurt mix. The starter culture is designed to enhance the growth of S. thermophilus so that resulting ripened yogurt base used to produce the frozen yogurt mixes, has a longer shelf life as a result of less development of acidity during storage, lower introduction of off flavor which often results when using hydrolyzed casein protein nutrients, and greater stability against spoilage by gram negative bacteria. The final products have improved viscosity and mouthfeel due to the generation of polysaccharides by the S. thermophilus.

We use S. thermophilus per se and refrain from the use of any lactobacillus microorganisms such as L. bulgaricus, although minor amounts of other microorganisms may be added to the ripened yogurt base or the frozen yogurt mix after the culturing processes have been completed, if desired. Preferably, if additional microorganisms are desired in the final product, such as a lactobacillus or a bifidobacterium, they should be added at a point in the process whereby they do not undergo more than one cell division, i.e., they have no significant contribution to the fermentation process.

Frozen yogurt does not have a standard of identity except in some states which require culturing with both S. thermophilus and L. bulgaricus as is required for most regular yogurt products. This invention would work equally well making normal yogurt with controlled levels of L. bulgaricus so as to maintain the extended shelf life characteristics should the standard of identity be changed such that L. bulgaricus could be added as set forth above.

In a preferred embodiment method, we inoculate the starter medium which contains an enzymatically prepared lactalbumin with S. thermophilus which is cultured; diluted; and added to the pasteurized yogurt base to obtain a level of 10 to 20 million bacteria per milliliter initially in the yogurt base. As long as the enzymatically prepared lactalbumin is utilized to promote the S. thermophilus growth in the culture medium, it is contemplated that some of the superior properties can also be obtained in the ripened yogurt base and final yogurt mix where sufficient other microorganisms, such as a mixture of L. bulgaricus and L. acidophilus, are added to the yogurt base at an initial level of about 1 million each per milliliter. This will assure a starting ratio in the yogurt base of about 20:1:1 of S. thermophilus to L. bulgaricus to L. acidophilus.

The dry culture medium of this invention contains a major amount of milk solids and a minor but substantial amount of a specific hydrolyzed milk protein nutrient. The medium additionally contains a yeast and phosphate nutrient.

The milk solids can include sweet whey, dry milk, nonfat dry milk, cream and similar milk solids. We prefer to employ from 30 to 75 weight percent milk solids, more particularly 60 to 70 weight percent primarily a combination of sweet whey and nonfat dry milk solids. Preferably, about 2 parts sweet whey is used for each part of dry nonfat milk solids to develop the milk solids employed in our culture medium.

We employ up to 5 weight percent, preferably 1 to 4 weight percent yeast which can be obtained from any food approved edible yeast.

We employ up to 5 weight percent of one or more phosphates to improve the nutrient balance of our starter medium; preferably 1 to 4 weight percent of disodium phosphate ($Na_2PO_4$).

Finally, we employ from 15 to 65 weight percent; and preferably from 20 to 40 weight percent; of a hydrolyzed milk protein of neutral flavor which can be prepared from lactalbumin. We prefer to use an enzymatically prepared lactalbumin, such as Dellac LE80GMX specifically, a whey protein hydrolysate manufactured using food grade enzymes, available from Deltown Chemurgic Corporation, P. O. Box 712, Fraser, N.Y. 13753. All of the above weight percents of the material in the culture medium are based on the total weight of the dry culture medium.

Dellac LE80GMX is an enzymatic digest of lactalbumin specifically designed for nutritional applications. The lactalbumin is an excellent source of nutritionally balanced essential amino acids and has an exceptionally good flavor. The lactalbumin has the following characteristics:

| | |
|---|---|
| Amino Nitrogen (AN) | 4.9% |
| Total Nitrogen (TN) | 11.4% |
| AN/TN × 100 | 43.0% |
| Total Protein (TN × 6.38) | 72.7% |
| Ash | 4.3% |
| NaCl | 1.3% |
| Moisture | 5.5% |
| pH (6% solution) | 6.8% |
| Microbial Content | |
| Standard Plate | <30,000/gm. |
| Coliform | <10/gm. |
| Thermophiles | <1,000/gm. |
| Yeast and Mol | <100/gm. |
| Salmonella | Neg./25 gm. |

Solubility - 100 gm./liter at 25° C.

The culture medium is employed in a concentration of from about 5 to about 15 weight percent, preferably from 8 to about 12 weight percent (based on the total starter culture weight) in water. We use about 120 lbs. of dry culture composition for each 150 gallons of water, or about 10 weight percent. Obviously, more or less of the culture medium may be added to the water but we have found that using about 10 weight percent of the total formulation weight, which follows, gives good results.

The preferred culture medium is prepared by dry blending the following ingredients. Blending and packaging time should be minimized to prevent moisture absorption during blending.

| Dry Culture Ingredients | Weight Percentage in Dry Blend |
|---|---|
| Grade A Sweet Whey | 45.0% |
| Grade A Nonfat Dry Milk | 20.0% |
| YE 2200 Yeast Extract - Gist Brocades | 2.5% |
| Disodium Phosphate | 2.5% |
| Lactalbumin - LB80GMX, Deltown | 30.0% |
| Chemurgics | |
| Total Ingredients: | 100.0% |

The medium should be checked for quality prior to use in preparing frozen yogurt. 100 grams of dry culture ingredients are mixed into one liter of water. The mixture is pasteurized at 190° F. for 30 minutes. The pasteurized mixture is then cooled to 108° F. and inoculated with *S. thermophilus* freeze-dried culture. The inoculated culture is maintained at a pH of 6.0 by the addition of a suitable base such as ammonium hydroxide for about 8 hours to develop the bacterial content of the culture.

1000 gallons of pasteurized yogurt base having about 14 to 20 weight percent nonfat solids is inoculated with 25 gallons of the starter culture and incubated at from 108° to 110° F. for 5 to 6 hours.

The ripened yogurt base is cooled to 40° F. when the titratable acidity reaches 1.2 to 1.4%. Final titratable acidity can be predetermined by selection of solids level in the yogurt base when using this system. The refrigerated ripened yogurt base is combined with the remaining yogurt ingredients to make the finished product frozen yogurt mix.

The nonfat solids content of the yogurt base is adjusted from about 14 to 20 weight percent of the base, preferably 16 to 20 weight percent, and most preferably 17 to 19 weight percent in order to hold titratable acidity in the range of 1.2 to 1.4 weight percent.

The starting pH of frozen yogurt mix will vary depending on the flavor, but generally it will be greater than 5, preferably in the range of from greater than 5.0 to about 6.0. A relatively rapid drop in pH during the refrigerated storage of the final frozen yogurt mix would generally prevent gram negative bacterial spoilage, but strong acid flavor is considered undesirable in a frozen yogurt product. Therefore, maintenance of a stable, relatively high pH together with retardation of gram negative spoilage is necessary. This has not been possible before and is achieved by the instant invention.

EXAMPLE 1

A plant trial is run using a culture medium having the following formula:

| Dry Culture Ingredients | Weight Percentage in Dry Blend |
|---|---|
| Grade A Sweet Whey | 35.0% |
| Yeast Extract | 2.5% |
| Disodium Phosphate | 2.5% |
| Lactalbumin (enzymatically digested) | 60.0% |
| Total Ingredients | 100.0% |

The culture medium is added to water to give about 10 weight percent solids. 250 gallons of the mixture is pasteurized and cooled. 60 grams of freeze dried *Streptococcus thermophilus*, is added and the mixture cultured for eight hours at a temperature of about 108° F. Liquid ammonia is added during the fermentation to maintain a pH of between 5.8 and 6.3. The starter culture is added at 2.5 weight percent to a pasteurized yogurt base and cultured. Freeze dried *L. acidolphilus* and *L. bulgaricus* are added to the pasteurized yogurt base such that they do not participate in the fermentation process, i.e., they do not undergo more than one cell division. This results in a final count of from about $1\times10^5$ to about $1\times10^6$ of each microorganism per milliliter of base. Fresh frozen yogurt product prepared from this unique culture medium and starter culture has flavor as good or better than yogurt made using standard co-cultures.

EXAMPLE 2

Another plant trial is made using a culture medium having one half of the lactalbumin replaced by skim milk solids. The culture medium has the following formula:

| Dry Culture Ingredients | Weight Percentage in Dry Blend |
| --- | --- |
| Grade A Sweet Whey | 45.0% |
| Grade A Nonfat Dry Milk | 20.0% |
| Yeast Extract - YG 2200 from Gist Brocades | 2.5% |
| Disodium Phosphate | 2.5% |
| Lactalbumin - Dellac LE80GMX | 30.0% |
| Total Ingredients | 100.0% |

The culture medium is added to water to give about 10 weight percent solids. 250 gallons of the mixture is pasteurized and cooled. 60 grams of freeze dried *Streptococcus thermophilus* is added and the mixture cultured at 108° F. for 8 hours at pH 6, adjusting the pH using a suitable base. 2.5 weight percent of the starter culture is added to a pasteurized yogurt base and cultured. Minor amounts of *L. acidophilus* and *L. bulgaricus* are added as in Example 1 to prepare two batches of yogurt having 18 and 14.5 weight percent SNF. The activity of the culture medium is somewhat less than Example 1. Samples are subject to shelf life studies at 40° F. which are reported in Example 4. Both cultures give finished yogurt products with excellent flavor and mouthfeel.

The yogurt base is prepared from 15 to 20% milk solids made from condensed milk.

Frozen yogurt mix is prepared by blending the ripened yogurt base with a second mixture containing stabilizers, milk solids, sugar and water. The ripened yogurt base portion of the frozen yogurt mix is from about 5 to about 40 weight percent based on the total weight percent of the frozen yogurt mix; about 10 to 15 weight percent for low acid flavors and about 25 to 35 weight percent for high acid frozen yogurt flavors.

Higher solids levels give a higher plateau for developed acidity. The plateau acidity can be adjusted as high as 1.5 or 1.6 TA by using appropriate high solids amounts. Levels of 16 to 20 weight percent solids develop very good TA.

EXAMPLE 3

A plant trial is made using the culture medium of Example 2 to prepare a starter culture as in Example 2. The starter culture is added at 2.5 weight percent to pasteurized yogurt base having a 19.2 weight percent SNF level for maximum TA development and cultured. Freeze dried *L. acidophilus* and *L. bulgaricus* are added as in Example 1.

The finished products from this trial are indistinguishable from controls made with a regular starter culture containing both *S. thermophilus* and *L. bulgaricus* and shelf life studies on samples of these products at 40° F. are reported in Example 4.

EXAMPLE 4

Products from both Example 2 and Example 3 are stored at 40° F. and tasted periodically. Results are summarized on the following Table 1. Perhaps the most significant observation from the shelf life studies is a significant improvement both in resistance to gram negative spoilage and in control of acid development in the test samples. Between the two trials, 10 of the 12 samples show no gram negative spoilage or high acid development in six weeks at 40° F. Of three control samples made with the regular *L. bulgaricus* and *S. thermophilus* starter culture, two display severe gram negative spoilage and the third drops so low in pH to 4.37 that it can be considered acid spoiled. (Gram negatives cannot grow below pH 4.6, however, frozen yogurt below this pH is deemed unpalatable.) More remarkably, four of the Example 2 samples are shelf stable for 75 days. These samples are opened repeatedly for tasting during that time and show no significant acid development, and only two are spoiled by gram negatives.

The Control Strawberry sample has a 6 week pH of 4.37 with a noticeable acid taste whereas the two strawberry mixes made with the starter culture of this invention have considerably higher pH's of 5.24 and 4.86 with good taste. A similar benefit can be seen in comparing the Control Vanilla sample with the mixes of this invention.

Even though the Control Chocolate has a similar 6 week pH as the chocolate of this invention, there is a noticeable flavor or taste deterioration in the control which results from bacterial spoilage.

TABLE 1

Shelf-life of Frozen Yogurt Mix Commercial Plant Samples Held at 40° F.:

| Flavor | Example | 6 Week Taste | 6 Week pH | 11 Week Taste | 11 Week pH |
| --- | --- | --- | --- | --- | --- |
| Butter Pecan | 2 | Good | 5.88 | Good | 5.29 |
| Strawberry | 2 | Good | 5.24 | Good | 4.72 |
| Banana | 2 | Good | 5.90 | * | 5.32 |
| Vanilla | 2 | Good | 5.98 | * | 5.51 |
| Banana | 3 | Good | 5.41 | | |
| Pistachio | 3 | * | 4.98 | | |
| Vanilla | 3 | Good | 5.25 | | |
| Macadamia | 3 | * | 5.24 | | |
| Chocolate | 3 | Good | 5.90 | | |
| Strawberry | 3 | Good | 4.86 | | |
| White Russian | 3 | Good | 5.42 | | |
| Straw. Cheesecake | 3 | Good | 5.59 | | |
| Control Chocolate | 2 | * | 5.80 | | |
| Control Strawberry | 3 | Fair Acidic | 4.37 | | |
| Control Vanilla | 3 | * | 4.67 | | |

* Off taste resulting from gram negative bacteria caused spoilage.

The preceding examples establish that use of the specific hydrolyzed lactalbumin starter cultures of this invention to culture *S. thermophilus* in a lactobacillus-free and bifidobacteria-free environment:

a) Improves refrigerated product shelf life (up to 45° F.) of frozen yogurt mix due to reduced gram negative spoilage;

b) Improves or maintains high yogurt culture identity with minimal flavor interference by the specific milk protein nutrient, i.e., the enzymatically treated lactalbumin, with reduced after-acidification during refrigerated storage of the yogurt mix, especially frozen yogurt mix which has a higher pH, i.e., greater than 5;

c) Improves control of initial acid development in the yogurt base due to the self-limiting nature of the fermentation of *S. thermophilus*; and d) Improves viscosity and water-binding properties of the culture through use of various levels of polysaccharide producing *S. thermophilus* strains.

Yogurt is normally not prepared with a non-milk stimulant starter medium. Yogurt is usually prepared by simply adding the mixture of *S. thermophilus* and *L. bulgaricus* (roughly equal portions) to milk, which is then grown to whatever natural balance the organisms can achieve. The prior art has heretofore believed, that to obtain a yogurt with the good flavor characteristics of traditional yogurt, the presence of *L.*

*bulgaricus* was necessary to promote the growth of *S. thermophilus*. Stimulated starter systems using *S. thermophilus* by itself to prepare a yogurt mix have heretofore not been used commercially for the production of yogurt mix because they were too strongly flavored by the standard yeast and/or prior art hydrolysates such as casein hydrolysates.

We have discovered that by using a specific flavor neutral hydrolyzed milk protein, that is an enzymatically digested lactalbumin, we are able to prepare a highly desirable culture medium, which when used with only *S. thermophilus* produces a starter culture that when subsequently used to culture a yogurt base realizes a yogurt mix, especially a frozen yogurt mix, with outstanding refrigerated shelf-life properties. In our invention, no lactobacillus or bifidobacterium need be used in the starter culture. Optionally, very controlled levels of microorganisms other than the *S. thermophilus*, may be added to the cultured base.

Serendipitously, in addition to the greatly reduced after-acidification during refrigerated conditions of the frozen yogurt mix of this invention, and the excellent taste of the product, for some unknown reason, the growth of gram negative bacteria, which usually thrive in the frozen yogurt mix pH range, is suppressed and, as a result, spoilage of the refrigerated frozen yogurt mix of this invention is significantly reduced.

What is claimed is:

1. A process for preparing a ripened yogurt base comprising the steps of:
    a) adding to water a dry culture medium comprising
        i) from about 30 weight percent to about 75 weight percent milk solids,
        ii) up to 5 weight percent yeast extract,
        iii) up to 5 weight percent phosphate, and
        iv) from about 15 to about 65 weight percent of an enzymatically treated lactalbumin, the above weight percents being based on the total weight of the dry culture medium;
    b) pasteurizing the resulting mixture;
    c) cooling the pasteurized mixture;
    d) inoculating the cooled mixture with a lactobacilli-free and bifidobacteria-free culture comprising *S. thermophilus;*
    e) culturing the inoculated mixture for a period of time sufficient to develop a yogurt starter culture;
    f) inoculating a yogurt base with said yogurt starter culture;
    g) culturing the inoculated yogurt base to develop a ripened yogurt base; and
    h) cooling the ripened yogurt base to a fermentation rate-reducing temperature.

2. The process of claim 1 wherein the enzymatically treated lactalbumen is a whey protein hydrolysate manufactured using food grade enzymes.

3. The process of claim 1 wherein said ripened yogurt base has a ratio of *S. thermophilus* to a microorganism selected from the group consisting of lactobacilli, bifidobacteria, and mixtures thereof of at least 5:1.

4. A process for preparing a frozen yogurt mix comprising the steps of:
    a) adding to water a dry culture medium comprising
        i) from about 30 weight percent to about 75 weight percent milk solids,
        ii) up to 5 weight percent yeast extract,
        iii) up to 5 weight percent phosphate, and
        iv) from about 15 to about 65 weight percent of an enzymatically treated lactalbumin, the above weight percents being based on the total weight of the dry culture medium;
    b) pasteurizing the resulting mixture;
    c) cooling the pasteurized mixture;
    d) inoculating the cooled mixture with a lactobacilli-free and bifidobacteria-free culture comprising *S. thermophilus;*
    e) culturing the inoculated mixture for a period of time sufficient to develop a yogurt starter culture;
    f) inoculating a yogurt base with said yogurt starter culture;
    g) cultivating the inoculated yogurt base to develop a ripened yogurt base;
    h) cooling the ripened yogurt base to a fermentation rate-reducing temperature; and
    i) blending the ripened yogurt base with a mixture comprising milk solids, sugar and water.

5. The process of claim 4 wherein the ripened yogurt base portion of the frozen yogurt mix is from about 5 to about 40 weight percent based on the total weight of the frozen yogurt mix.

6. The process of claim 4 wherein the frozen yogurt mix has a pH greater than 5.

7. The process of claim 1 comprising the additional step of
    adding to the cooled ripened yogurt base microorganisms selected from the group consisting of lactobacilli, bifidobacteria and combinations thereof such that the ratio of *S. thermophilus* to said microorganisms is at least 5:1.

8. The process of claim 4 comprising the additional step of
    adding to the cooled ripened yogurt base microorganisms selected from the group consisting of lactobacilli, bifidobacteria and combinations thereof such that the ratio of *S. thermophilus* to said microorganisms is at least 5:1.

* * * * *